United States Patent

[11] 3,537,547

[72] Inventor Edgar C. Rust, Jr.
 Williamstown, Massachusetts
[21] Appl. No. 761,523
[22] Filed Sept. 23, 1968
[45] Patented Nov. 3, 1970
[73] Assignee Crompton & Knowles Corporation
 Worcester, Massachusetts
 a corporation of Massachusetts

[54] VENTING SYSTEM FOR ECCENTRIC DRIVE
 10 Claims, 4 Drawing Figs.
[52] U.S. Cl. .................................................. 184/6,
 184/13
[51] Int. Cl. ..................................................... F16n 13/00,
 F16n 17/00
[50] Field of Search .......................................... 74/582,
 583, 467; 184/11, 13, 6(N), 6(Y); 28/(No search-
 consulted exam only); 117/139.5; 66/1

[56] References Cited
 UNITED STATES PATENTS
 955,062 4/1910 Fairfield ........................ 184/6X
 1,574,181 2/1926 Baker ............................ 184/6X
 FOREIGN PATENTS
 716,798 1/1942 Germany ....................... 184/13
Primary Examiner—Manuel A. Antonakas
Attorney—Howard G. Garner, Jr.

ABSTRACT: A venting system for the housing of an eccentric drive which reciprocates a connecting rod, a portion of which extends through an opening in the housing. The system includes a reciprocating pump which pumps air into and out of the housing in timed relation but opposite to the inherent pumping action due to the movement of the connecting rod into and out of the housing.

INVENTOR
EDGAR C. RUST JR.

BY *Howard D. Harner Jr.*

ATTORNEY

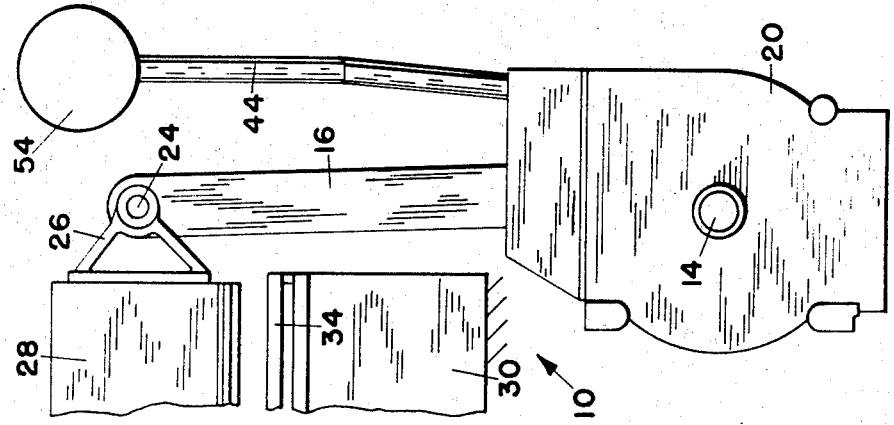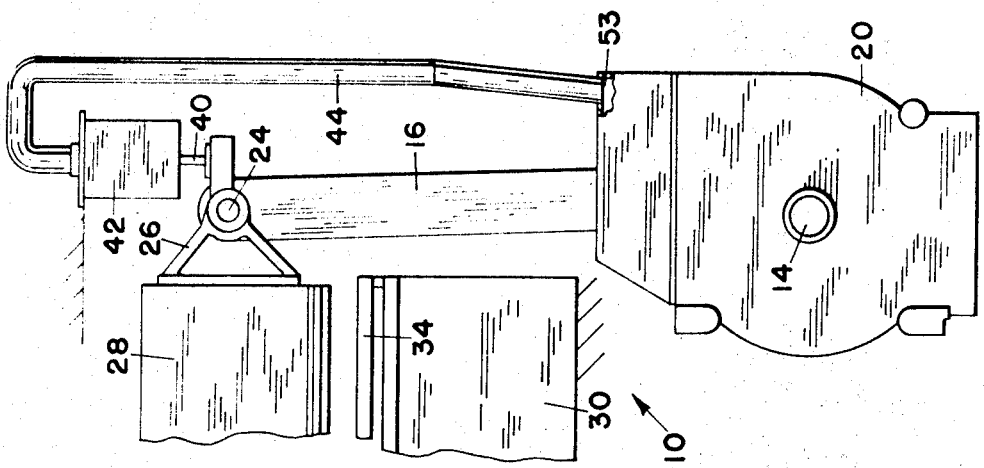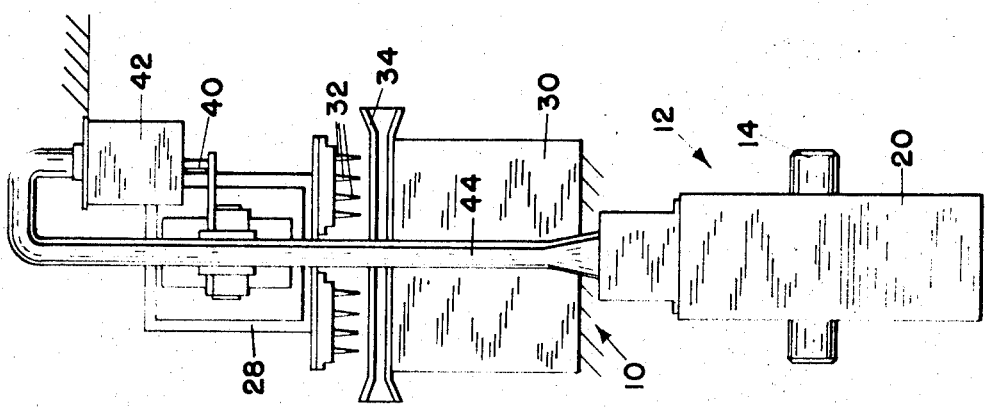

3,537,547

VENTING SYSTEM FOR ECCENTRIC DRIVE

BACKGROUND OF THE INVENTION

The present invention relates to a lubricating system for a crankcase and more particularly to venting means to prevent loss of lubricating fluid from the housing of the crankcase.

Since most mechanical drive assemblies are enclosed in a housing partially filled with oil to minimize frictional wear and insure smoother performance, splashing of oil or loss thereof has always been a problem. This problem becomes more acute in eccentric drives wherein the connecting rod extends beyond the housing through an opening. This opening has to be larger than the connecting rod to allow for the side to side movement of the arm due to the eccentric drive. The clearance of the opening of the housing allows for the free passage of air between the atmosphere and the interior of the housing.

As the eccentric drive operates to reciprocate the connecting rod between an outer and inner position, a great deal of oil is thrown about inside the housing. Much of this oil is reduced to small droplets which become entrained in the air within the housing. The movement of the connecting rod into and out of the housing produces a pumping action. This action results in air being drawn into the housing as the connecting rod moves to the outer position and out of the housing as the connecting rod moves to its inner position. The amount of air displaced during each movement is a function of the volume of the portion of the connecting rod which moves into and out of the housing. The oil droplets and air expelled from the housing during the inward movement of the connecting rod arm mixes with the air outside of the housing. Only a portion of this mixture is drawn back into the housing during the outward movement of the connecting rod, which results in a continuing loss of oil from the housing.

SUMMARY OF THE INVENTION

It is a principle object of the present invention to prevent the oil from being blown out of the housing of an eccentric drive by neutralizing the pumping action of the connecting rod.

It is a further object of the invention to use the motion of the connecting rod to control the neutralizing of the pumping action.

These objects of the invention are accomplished by the provision of a pumping action equal to and opposite to the pumping action produced by the connecting rod.

This pumping action is produced by a separate pump connected to the housing by a pipe or duct through which the oil laden air from the interior of the housing is directed. In this way, all of the oil blown out of the housing will be blown back into it so that there will be no oil loss.

The separate pump may be in the form of a piston and cylinder one side of which is connected to the pipe. The piston may be connected to the connecting rod and reciprocated thereby. The timing of the action of the piston in the cylinder will therefore be exactly right. It is, of course, necessary that the pipe be connected to the side of the cylinder which will produce a pumping action opposite to the pumping action produced by the motion of the connecting rod.

BRIEF DESCRIPTION OF THE DRAWINGS

Other objects and advantages will become apparent when the following description is read in conjunction with the accompanying drawings in which:

FIG. 2 is a side elevation looking in the direction of arrow 2 in FIG. 1, FIG. 3 is a view similar to FIG. 1, showing only one side of the machine with a first modification of the invention applied thereto, and FIG. 4 is a view similar to FIG. 3 which shows a second modification of the invention.

DETAILED DESCRIPTION OF THE INVENTION

Figure 1:
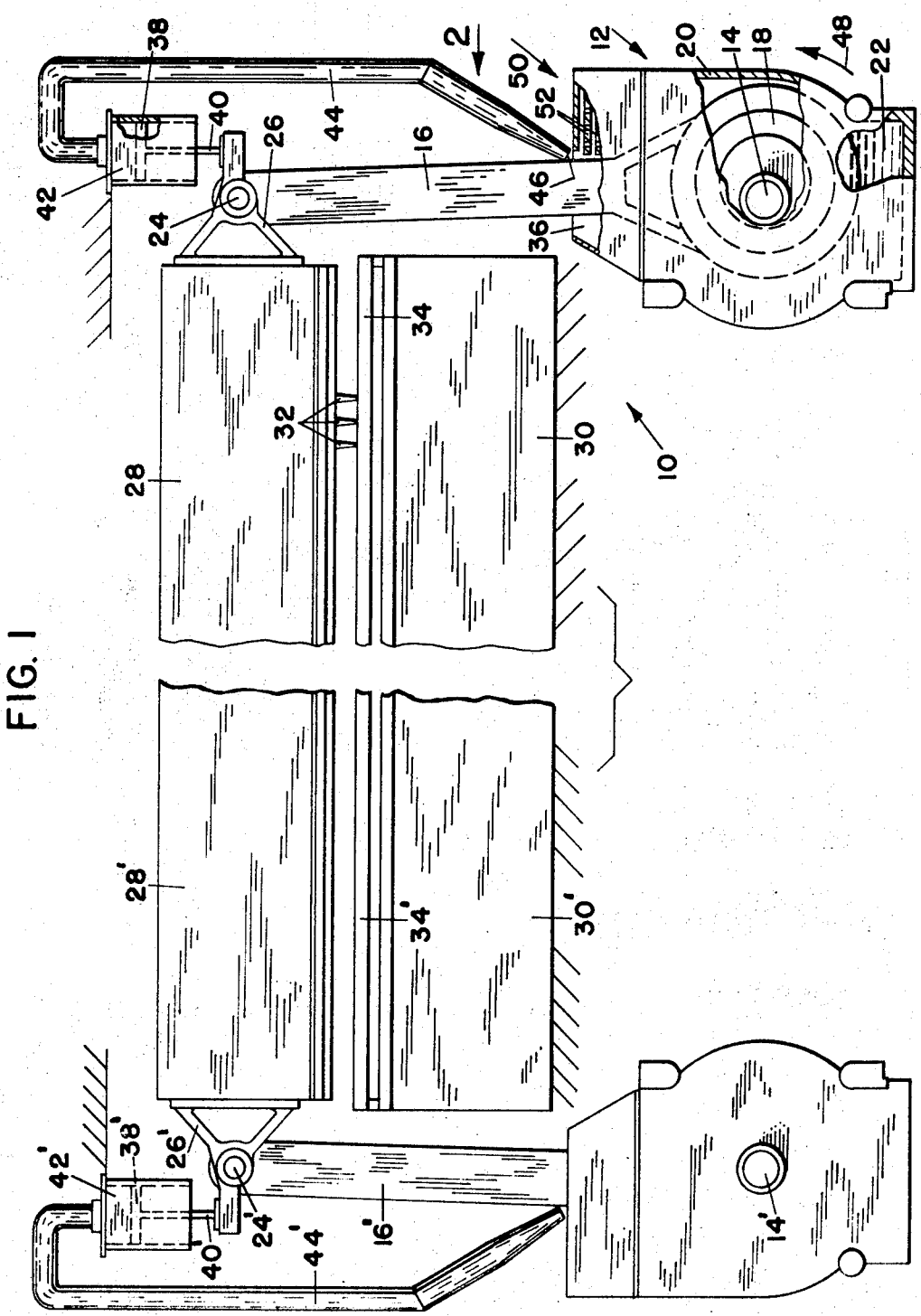
FIG. 1 is a diagrammatic front elevation of a needle felting machine with the preferred form of the invention applied thereto.

Referring to FIGS. 1 and 2, the preferred form of the invention is shown as it applies to the eccentric drive of a machine, indicated generally at 10. In this particular instance, machine 10 is a needling machine but the invention need not be limited to any particular type of machine or mechanism.

There is an eccentric drive for both ends of the machine and since they are identical only side will be described in detail, namely the right-hand side. Comparable parts on the left-hand side of the machine will be numbered the same except that they will bear a prime. The eccentric drive is generally indicated at 12 and includes a drive shaft 14 which is driven by a power source, not shown. Shaft 14 vertically reciprocates a connecting rod 16 through eccentric bearings indicated at 18. The bearings 18 and a portion of connecting rod are enclosed in a housing 20 which is partially filled with oil indicated at 22. The motion of the eccentric drive components through the oil causes the oil to be splashed around the inside of the housing to keep all moving parts well lubricated. The splashing creates small droplets of oil to be suspended in the air within the housing.

The upper end of rod 16 is pivotally connected at 24 to a bracket 26 which together with a similar bracket 26' on the other side of the machine supports a reciprocating beam 28 of the needling machine 10. As rods 16 and 16' are vertically reciprocated by their respective eccentric drives, reciprocating beam 28 is also reciprocated vertically toward and away from a perforated bed plate indicated at 30. The motion causes a series of needles 32 to repeatedly penetrate a moving web, not shown but which passes through the space between a perforated stripper plate 34 and the perforated bed plate 30.

Rod 16 extends from housing 20 through an opening 36 which is elongated in the left to right direction as shown in FIG. 1 so that there will be enough clearance to allow for the horizontal component of the eccentric motion of rod 16. As rod 16 is reciprocated vertically, air is pumped into and out of the housing due to the changing volume of material within the housing. The volume of air so pumped is equal to the volume of the portion of rod 16 which moves into and out of housing 20.

The upper portion of rod 16 is connected to a piston 38 through a piston rod 40. Piston 38 is mounted for reciprocation in a cylinder 42, one end of which is connected to a vent pipe 44. The lower end of pipe 44 is flattened into an elongated opening 46 which is located very close to the outer side of opening 36. As rod 16 is reciprocated vertically, piston 38 is reciprocated in cylinder 42 so that air is alternately blown into and drawn out of housing 20 through pipe 44. Since pipe 44 is connected to the top of cylinder 42, the pumping action produced by the piston will be exactly opposite to the pumping action produced by the movement of rod 16 into and out of housing 20. When oil laden air is therefore pushed out of housing 20 due to the downward motion of rod 16, piston 38 will also be moving downward in cylinder 42 thus creating a suction to draw this oil laden air into pipe 44. Pipe 44 is sufficiently long so that the amount of air drawn into the pipe will not be great enough to reach the cylinder 42. The oil droplets will be blown back into the housing 20 as piston 38 moves upwardly in cylinder 42 or drip back into opening 36 if any of these droplets accumulate on the inside wall of pipe 44.

The particular positioning of opening 46 of pipe 44 results in an additional advantage in that any oil adhering to rod 16 will be blown back into opening 36 as rod 16 is moved upwardly. Because of the rotation of shaft 14 as indicated by arrow 48, oil impinging on the outer surfaces of rod 16 is propelled upwards on the outside thereof and downwardly on the inside of rod 16. For this reason, it is important that opening 46 be placed near the outside of opening 36 so that the upward movement of oil on the outside of rod 16 can be counteracted when air is blown into opening 36 from pipe 44.

Again referring to FIG. 1, it has also been found effective to place a filter inside the housing near the outer portion of opening 36 to dampen some of the oil splash and yet allow air to pass through and allow oil to drip back down. This filter is generally indicated at 50 and is made up of a series of perforated plates 52 which are vertically spaced as indicated in FIG. 1.

A modification is shown in FIG. 3 which operates in a similar manner to the arrangement shown in FIGS. 1 and 2 except that pipe 44 has been modified so that it opens directly into housing 22 through an opening 53 which is spaced from opening 36. In this modification, air flow into and out of housing 22 is directed away from opening 36. Oil laden air will be drawn into tube 44 through opening 53 and substantially all of it will be blown back into the housing with minimal oil loss to the atmosphere.

FIG. 4 shows a second modification in which a separate independently operated pump indicated at 54 is directly connected to pipe 44 for blowing air into and drawing air out of housing 22 in a manner similar to that described for the preferred embodiment as shown in FIGS. 1 and 2.

Having described my invention, it should be apparent to those skilled in the art the other forms of pumping means could be used to counterbalance the pumping action of an eccentric drive as illustrated, as well as other changes without departing from the spirit or scope of the invention.

I claim:

1. In an eccentric drive assembly having a connecting rod and an eccentric drive member for reciprocating said connecting rod between an outward and inner position, a splash type lubricating means comprising:
   a. a housing enclosing said eccentric drive member and a portion of said connecting rod, said housing having a clearance opening through which said connecting rod extends and being partially filled with oil; and
   b. pneumatic pumping means for blowing air into said housing during the outward stroke of said connecting rod and for drawing air from said housing during the inward stroke of said connecting rod, whereby air is prevented from being blown out of said housing along said connecting rod as a result of the inherent pumping action of said eccentric drive assembly.

2. The eccentric drive assembly as described in claim 1 wherein said housing has a vent opening spaced from said clearance opening and said pumping means comprises:
   a. a tube, one end of which opens into said vent opening; and
   b. a pump connected to the other end of said tube for alternately blowing air into and drawing air out of said housing through said tube, whereby oil laden air will be drawn into said tube out of said housing and then blown back into the housing.

3. The eccentric drive assembly as described in claim 2 wherein at least a portion of said tube is located above said housing, the space in said portion being of greater volume than the air pumped out of said housing during each pumping cycle, whereby oil laden air will not reach said pump.

4. The eccentric drive assembly as described in claim 2 wherein there is a filter located beneath said opening for filtering droplets of oil from air being drawn into said tube.

5. The eccentric drive assembly as described in claim 4 wherein said filter is a plurality of flat perforated plates which are spaced from one another.

6. The eccentric drive assembly as described in claim 1 wherein said housing has a clearance opening through which said connecting rod extends, said opening being larger than the cross section of said rod to allow for the eccentric motion of said rod and wherein said pumping means comprises:
   a. a reciprocating pump; and
   b. a tube, one end of which is connected to said pump and the other end of which terminates close enough to said clearance opening so that air will be pumped into and out of said housing opening through clearance opening.

7. The eccentric drive assembly as described in claim 6 wherein there is a filter located beneath said opening for filtering droplets of oil from air being drawn into said tube.

8. The eccentric drive assembly as described in claim 7 wherein said filter is a plurality of flat perforated plates which are spaced from one another.

9. The eccentric drive assembly as described in claim 1 wherein said pneumatic pumping means comprises:
   a. a fixed cylinder;
   b. a piston mounted for reciprocation in said cylinder;
   c. a piston rod fixed at one end to said piston and at its other end to said connecting rod for reciprocating said piston in synchronism with the reciprocation of said connecting rod; and
   d. a tube for pneumatically connecting said cylinder to said housing.

10. In a textile needling machine having a perforated bed plate, a needle supporting beam, a connecting rod attached to said needle supporting beam, an eccentric drive member for reciprocating said connecting rod between an outward and inner position for moving said supporting beam toward and away from said bed plate, a splash type lubricating means comprising:
   a. a housing enclosing said eccentric drive member and a portion of said connecting rod, said housing having a clearance opening through which said connecting rod extends and being partially filled with oil; and
   b. pneumatic pumping means for blowing air into said housing during the outward stroke of said connecting rod and for drawing air from said housing during the inward stroke of said connecting rod, whereby air is prevented from being blown out of said housing along said connecting rod as a result of the inherent pumping action of said eccentric drive assembly.